Sept. 9, 1941. L. K. LOEHR 2,255,671
POWER TRANSMITTING MECHANISM
Filed June 20, 1939
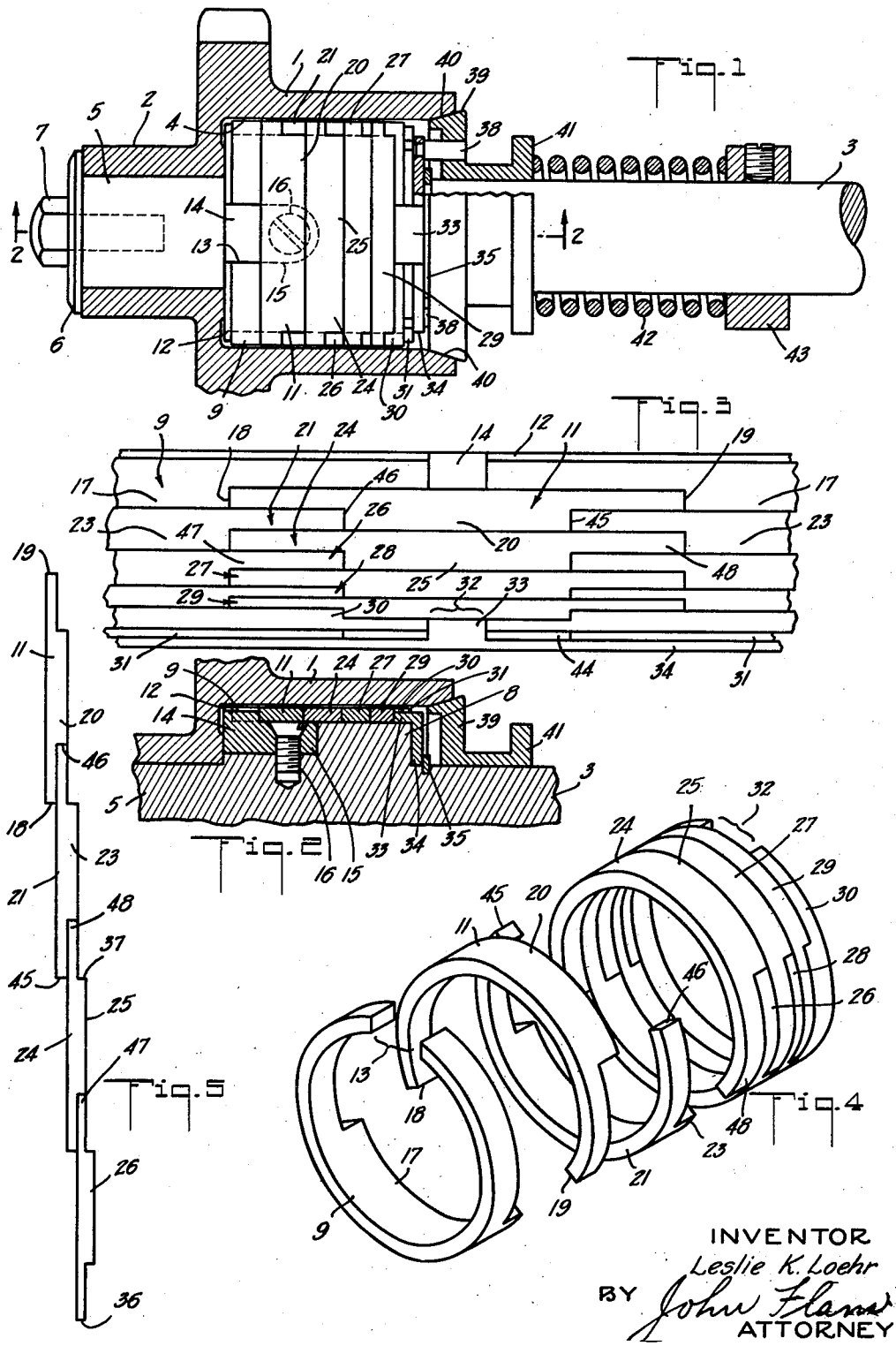
INVENTOR
Leslie K. Loehr
BY John Flann
ATTORNEY Patented Sept. 9, 1941

2,255,671

UNITED STATES PATENT OFFICE 2,255,671

POWER TRANSMITTING MECHANISM

Leslie K. Loehr, Los Angeles, Calif., assignor to Guy H. Hall, Los Angeles, Calif.

Application June 20, 1939, Serial No. 280,087

11 Claims. (Cl. 192—35)

This invention relates to a system for transmitting power through a control mechanism.

This application is concerned with the type of apparatus disclosed in an application filed June 4, 1938, in the names of Stover C. Winger and Leslie K. Loehr, entitled: "Power transmitting system" and having Serial No. 211,864.

In general, the mechanism may be used as a clutch between driving and driven elements of the "wrap around" type, although it may also be used for braking.

It is one of the objects of this invention to provide a mechanism of this character that operates to transfer power for either direction of rotation, without any possibility of "free wheeling," and that can be manufactured inexpensively.

In furtherance of this object, there are provided a number of ring segments adapted to be expanded into frictional engagement with the internal cylindrical surface of one of the elements. It is another object of this invention to provide segments of this character which are active quite uniformly about their entire angular extent.

Another object of the invention is to provide a segmental clutch operative for either direction of rotation, and not affected by centrifugal force.

This invention possesses many other advantages, and has other objects which may be made more easily apparent from a consideration of one embodiment of the invention. For this purpose there is shown a form in the drawing accompanying and forming part of the present specification. This form will now be described in detail, illustrating the general principles of the invention; but it is to be understood that this detailed description is not to be taken in a limiting sense, since the scope of this invention is best defined by the appended claims.

Referring to the drawing:

Figure 1 is a view, mainly in longitudinal section, showing a mechanism embodying the invention;

Fig. 2 is a fragmentary sectional view, taken along plane 2—2 of Fig. 1;

Fig. 3 is a fragmentary development illustrating the manner in which the bands are interconnected;

Fig. 4 is a pictorial view of the bands shown in the process of assembly; and

Fig. 5 is a diagrammatic development of some of the bands, illustrating the manner in which they serve to transmit forces from one to another.

The member 1 having a bearing extension or boss 2 can form one of the elements of the mechanism. The other element may be a shaft 3 arranged, in this instance, coaxial with the member 1. The member 1 has an internal cylindrical surface 4 which forms one of the two cooperating surfaces adapted to be placed in frictional engagement for power transfer between member 1 and shaft 3.

The shaft 3, as illustrated more clearly in Figures 1 and 2, may be provided with an extension 5 journaled in the boss or extension 2 of the member 1.

In order to restrain relative axial movement between the members 1 and 3, use may be made of an end washer 6 adapted to engage the end surface of the boss or extension 2 and held in place as by a cap screw 7 threaded into the extension 5 of the shaft 3.

As shown most clearly in Fig. 2, the shaft 3 has an intermediate enlarged portion 8 having a periphery coaxial with and opposite the internal cylindrical surface 4 of the member 1. Interposed between the cylindrical surface 4 and the enlarged portion 8 are a number of bands that are interconnected to form a number of complete turns, and that are adapted to be expanded so that they are urged into frictional contact with the surface 4. These bands form a connection between the member 1 and the member 3. This is accomplished by coupling the end ring 9 of the series to the shaft 3. The member 1 may be considered to be the driving member and the shaft 3 is the driven member, although this arrangement may be reversed.

The bands are progressively increased in width from the right hand band 30 to the band 11 next to the end band 9, for the purpose of reducing the pressure per unit of engaging surface of the series of bands. Since the prior application referred to above fully explains the building up of pressure in this progressive manner, further explanation thereof is rendered unnecessary.

The end band 9 arranged at the left of the series of bands is shown as placed to the right of a flange 12 formed integrally with the enlarged portion 8 of the shaft 3. This band has a relatively narrow open split or gap in it, designated by the numeral 13 in Fig. 4. In this gap is inserted a key 14 having an extension 15 extending below the next band 11. This extension serves to accommodate the radial screw 16 by the aid of which the key 14 is fastened to the enlarged portion 8. This enlarged portion is appropriately slotted to accommodate the key 14 and its extension 15.

Diametrically opposite the slot 13 of the end band 9 there is an integral tongue 17 extending in an axial direction, and shown to best advantage in Fig. 4. This tongue 17 fits into the split or gap formed between the ends of the next band 11. The ends 18 and 19 of this band 11 are shown in developed form in Fig. 3. The angular extent of the tongue 17 and of the gap between the ends 18 and 19 of band 11 is made large, but less than one half the circumference; for example of the order of 120°.

By referring to Fig. 4, it will be seen that each band or ring, other than the end bands 9 and 30, comprises somewhat over half a circumference; for example 240°. That is, each band has a wide split or gap as indicated for example between surfaces 18 and 19 of band 11, and between surfaces 45 and 46 of band 21. Also each band carries a key or tongue diametrically opposite the gap and of equal angular extent, as indicated by 20 on band 11. Thus in each band, each end of the tongue is diametrically opposite a corresponding end of the gap. The bands are assembled with the tongue of one band fitting into the split or gap of the next adjacent or succeeding band, as shown in Fig. 3. Any force tending to cause relative rotation between the bands, so as to expand them, acts through the tongue of one band and the ends of the adjacent or succeeding band. Thus, referring again to Fig. 4, rotation of band 21 in a counterclockwise direction, for example, will cause surface 46 to engage the corresponding end of tongue 20, imparting a rotary force to band 11. This causes surface 18 of band 11 to engage the corresponding end of tongue 17 on band 9. Since band 9 is coupled to the load by slot 13 and key 14 it will resist rotation; the opposing forces applied to tongue 20 and surface 18 will cause band 11 to expand, and since the points of application of these forces are diametrically opposite, the force is transmitted through a half of the circumference of band or ring 11. Similar action results if the rotative force is in the opposite direction. Similarly, the band 21 is joined by its tongue 23 to the next band 24. This band in turn is provided with a tongue 25 engaging the split ends of the next band 26. This manner of joining the bands is continued for the succeeding bands 27, 28, 29 and 30. Thus each band has force transmitted through one half of its circumference.

The right hand ring 30 is shown as being placed adjacent the left hand edge of a flange 31 formed integrally with the enlarged portion 8 of the shaft 3.

This end band 30 has a split or gap 32 into which engages a tongue or key 33. This tongue or key 33 is formed integrally with a disk 34, mounted for free rotation on the shaft 3 and held against axial movement as by a snap ring 35. Disc 34 is free to move angularly with relation to flange 31 of shaft 3, since this flange has a slot 44 (Fig. 3) to permit the passage of key 33 into the split 32 of the band 30.

It is clear that by turning the disk 34 in either direction relative to the shaft 3, an expansion force will be transmitted from the tongue 33 to the band 30 and then from band 30 to the other bands in succession, until all of them are expanded. The forces transmitted from one band to the next are transmitted through virtually 180° of arc by the aid of the tongues such as 17, 20 and 25. Accordingly these bands expand until they become tightly clutched to the internal surface 4 of the member 1, and there is a driving relation between the member 1 and the shaft 3.

Fig. 5 illustrates in more diagrammatic fashion the manner in which these expansion forces are secured. In this instance, only four bands are shown in the developed form. They may comprise bands 11, 21, 24 and 26. Assuming that there is an upward thrust through band 26, corresponding to one direction of rotation of disc 34, this thrust is transmitted through the upper ends of each of the bands 26, 24, 21 and 11 to the next succeeding band. The thrust through each band, such as 24, is transmitted from the end 47 of the previous band 26, and is transmitted by the end 48 of the band 24 to the next band 21. These ends 47 and 48 are 180° apart. A downward thrust corresponding to a reverse rotation of disc 34 will cause a similar expanding force to be exerted by the end surface 36 (which of course is in contact with end surface 37 in the actual assembly of the device), to this surface. In this way any torque exerted in either direction on the end band 30 is effective to expand the series of bands in driving or gripping relationship with the internal cylindrical surface 4.

These bands may be made of appropriate spring material such as tobin bronze, or even of high grade cast iron, having sufficient resilience to return to their unexpanded positions illustrated in Figs. 1 and 2, as soon as the torque is relieved from the end band 30. Furthermore, they are simple to manufacture, as by ordinary slotting or sawing.

The manner in which torque may be exerted upon the end ring 30 will now be described. For this purpose the disk 34 carrying the tongue or key 33 may be provided with a pair of pins 38 extending in an axial direction and adapted to be engaged in appropriate apertures in a pilot clutch member 39. It is seen that by turning the pilot clutch member 39 in either direction this turning force is transmitted through the pins 38 to the disk 34. This pilot clutch member has a sloping clutching surface 39 adapted to engage a corresponding sloping clutching surface 40 at the end of the member 1.

The pilot clutch member 39 is shown as formed integral with a shift collar 41 freely slidable on shaft 3. Normally this collar is urged as by a compression spring 42 to engaging position. The right hand end of the spring 42 abuts an adjustable collar 43 mounted on the shaft 3. By appropriate manipulation of the shift collar 41 either automatically or manually, the pilot clutch member 39 may be disconnected from the surface 40. If allowed to engage as shown in Figs. 1 and 2, rotation of member 1 in either direction will operate the pilot clutch and cause an expanding torque to be exerted on the series of bands to couple the members 1 and 3 together. However, as soon as the pilot clutch 39 is disengaged, the expansion force on band 30 is no longer present, and the bands are free to contract out of contact with the member 1.

Each band of the series extends considerably over one-half of a circumference; centrifugal force is prevented from urging them radially outwardly, even when the shaft 3 is rotated at a high speed.

What is claimed is:

1. In a mechanism of the character described, means forming an internal cylindrical surface, and a plurality of interconnected open-ended bands adapted to engage said surface, said bands forming a common cylindrical surface, adjacent pairs of bands being joined by a tongue extending from one band into the gap of the other, the ends of the tongue being adapted to engage abrupt end surfaces of the adjacent band, the angular extent of the tongue forming a substantial part of the entire circumference, and the ends of the tongue being spaced from the ends of the corresponding band.

2. In a mechanism of the character described, means forming an internal cylindrical surface, a plurality of interconnected open ended bands adapted to engage said surface, said bands forming a common cylindrical surface, adjacent pairs of bands being joined by a tongue extending from one band into the gap of the other, the ends of the tongue being adapted to engage abrupt end surfaces of the adjacent band, the angular extent of the tongue forming a substantial part of the entire circumference, and the ends of the tongue being spaced from the ends of the corresponding band, means coupling an end band to the means that forms the cylindrical surface, and a member coupled to the other end band.

3. In a mechanism of the character described, means forming an internal cylindrical surface, and a plurality of interconnected open ended bands adapted to engage said surface, said bands forming a common cylindrical surface, adjacent pairs of bands being joined by a tongue extending from one band into the gap of the other, the ends of the tongue being adapted to engage abrupt end surfaces of the adjacent band, the angular extent of the tongue being less than one-half of a complete circumference, and the ends of the tongue being spaced from the ends of the corresponding band.

4. In a mechanism of the character described, means forming an internal cylindrical surface, a plurality of interconnected open-ended bands adapted to engage said surface, said bands forming a common cylindrical surface, adjacent pairs of bands being joined by a tongue extending from one band into the gap of the other, the ends of the tongue being adapted to engage abrupt end surfaces of the adjacent band, the angular extent of the tongue forming a substantial part of the entire circumference, and the ends of the tongue being spaced from the ends of the corresponding band, and a disengageable pilot clutch for initiating the expansion of the bands.

5. In a mechanism of the character described, means forming an internal cylindrical surface, and a plurality of interconnected open-ended bands adapted to engage said surface, said bands forming a common cylindrical surface, adjacent bands being connected by a tongue extending from one band into the gap of the other, the ends of the tongue being adapted to engage abrupt end surfaces of the adjacent band, the ends of the tongue on one band being substantially diametrically opposite the ends of the tongue on the adjacent band.

6. In a mechanism of the character described, means forming an internal cylindrical surface, and a plurality of interconnected open-ended bands adapted to engage said surface, said bands forming a common cylindrical surface, each band having a tongue extending into the gap of an adjacent band, an end surface of the tongue being adapted to engage one of the end surfaces of the band which define the gap, the angular extent of the tongue of a band and the angular distance from the end of said tongue to the end of the gap of said band being such that their sum is substantially 180°.

7. In a mechanism of the character described, means forming an internal cylindrical surface, and a plurality of interconnected open-ended bands adapted to engage said surface, said bands forming a common cylindrical surface, each band having a tongue extending into the gap of an adjacent band, an end surface of the tongue being adapted to engage one of the end surfaces of the band which define the gap, and the ends of the tongue being spaced from the ends of the corresponding band, the angular extent of each band being substantially greater than 180°.

8. In a mechanism of the character described, means forming an internal cylindrical surface, and a plurality of interconnected open ended bands, there being a gap between the open ends, said plurality of bands having exterior surfaces adapted to cooperate with and engage the internal cylindrical surface, adjacent pairs of bands being joined by a tongue extending from one band into the gap of the other, the tongue extending over an angle of at least 90°, and the ends of the tongue being spaced from the ends of the band.

9. In a mechanism of the character described, means forming an internal cylindrical surface, and a plurality of interconnected open ended bands, there being a gap between the open ends, said plurality of bands having exterior surfaces adapted to cooperate with and engage the internal cylindrical surface, adjacent pairs of bands being joined by a tongue extending from one band into the gap of the other, the tongue extending over an angle of at least 90°, and the tongue being symmetrically disposed with respect to the ends of the band, said band having an angular extent of at least 180°.

10. In a mechanism of the character described, means forming an internal cylindrical surface, and a plurality of interconnected bands having exterior surfaces adapted to cooperate with and engage the internal cylindrical surface, each of said bands having an angular extent of less than 360°, whereby a gap is formed between the ends of the band, successive bands being joined by a tongue extending from one band into the gap of the succeeding band, the tongue being symmetrically disposed with respect to the ends of its supporting band.

11. In a mechanism of the character described, means forming an internal cylindrical surface, and a plurality of interconnected bands having exterior surfaces adapted to cooperate with and engage the internal cylindrical surface, each of said bands having an angular extent of less than 360°, whereby a gap is formed between the ends of the band, the gaps of successive bands being diametrically opposite as well as offset axially with respect to each other, successive bands being operatively joined by surfaces carried by one band and adapted to engage the surfaces forming the ends of the gap of the succeeding band.

LESLIE K. LOEHR.